INVENTOR.
JOHN L. VAALA

United States Patent Office 3,194,072
Patented July 13, 1965

3,194,072
CONDITION RESPONSIVE DEVICES
John L. Vaala, St. Louis Park, Minn., assignor to
Honeywell Inc., a corporation of Delaware
Filed Feb. 2, 1962, Ser. No. 170,694
6 Claims. (Cl. 73—356)

There has been a widespread need for devices which will cheaply and conveniently give an indication of the time and temperature history of an article or system. While many means are available to accomplish this indication, these means have generally either been costly or cumbersome in operation. For example, a recording indicator coupled with a thermocouple will provide this type of information. However, both the recorder and the thermocouple proper are generally prohibitedly expensive and can be used only in limited numbers. Many products are of the type which require individual records of their time and temperature experience and therefore any such means as this would prove unsatisfactory.

In the co-pending application of Bernt M. Tessem Serial No. 754,573, filed August 12, 1958 entitled "Condition Responsive Device" now Patent No. 3,046,786 and in the co-pending application of James J. Renier Serial No. 137,322, filed September 11, 1961, entitled "Condition Responsive Device" now Patent No. 3,082,264 and in the copending application of William T. Morin filed January 19, 1962 entitled "Condition Responsive Device" now Patent 3,170,860 all assigned to the same assignee as the present invention, there are disclosed devices which meet the requirements of compactness and inexpensiveness. The devices disclosed in these co-pending applications present means for time and temperature experience of articles or systems. The devices as disclosed in the co-pending applications are particularly suited for use in indicating time-temperature experience at temperatures below 32° F. While these devices are generally satisfactory, there still exists a need for the ready control of the rate of indication so as to provide a device adaptable to varying needs. Particularly there is a need for modification of these devices for use at temperatures above the freezing point of water. For example, the rate at which a substance such as refrigerated blood would deteriorate upon exposure to certain temperatures for varying periods of time would be quite different from the rate at which a refrigerated food product might deteriorate. Thus, there exists a need for a device which operates at elevated temperatures and which may be readily tailored for a particular system it is desired to know the time-temperature history of.

The present invention provides a solution to the problem of the use of the devices of the above identified co-pending applications to tailor them to operation both at temperatures in excess of the freezing point of water and further provides a means of varying the rate of indication at any given temperature. This is accomplished through modification of the electrolyte substances used in each of the above identified co-pending applications.

The present invention may be best understood with regard to the attached figures wherein.

Figure 1:
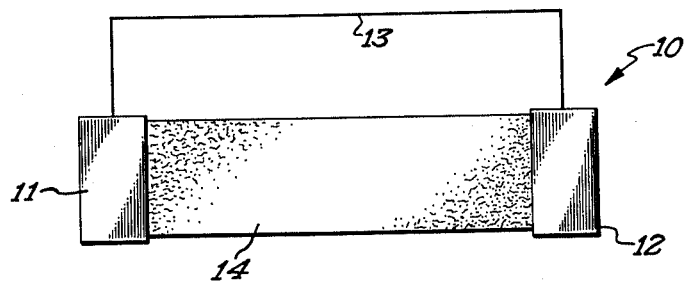
FIGURE 1 shows a schematic illustration of a device in accordance with the co-pending Tessem application.

The present invention can be best understood with regard to the operation of devices in the co-pending applications. Referring to FIGURE 1, it is seen that 10 generally designates a device in accordance with the co-pending Tessem application. 11 and 12 denote respectively strips of dissimilar metals such as copper and cadmium respectively. These metal members are connected by an external circuit wire identified as 13. 14 designates a porous matrix of a material such as filter paper or porous ceramic which contains a quantity of water and an electrolyte material such as sodium chloride. In one modification the sodium chloride is present in a quantity of about 5% by weight. This water-electrolyte combination will be hereinafter referred to as the electrolyte. The porous matrix is impregnated with a quantity of an indicator substance such as brilliant yellow and a lesser quantity of a complexing agent such as ethylene diamine tetra acetic acid. The brilliant yellow is present in quantities sufficient to give a distinct color, whereas the ethylene diamine tetra acetic acid (EDTA) is present in a quantity of approximately 0.1% by weight. Normally the electrolyte is contained within a glass capsule or the like in direct contact with the porous matrix. This is not shown. When the glass capsule is mechanically fractured, the electrolyte penetrates into and is distributed throughout the porous member 14 thus completing the electrical circuit. A galvanic cell has been produced which generates hydroxyl ions at one metal-electrolyte interface and metal ions at the other metal-electrolyte interface. In the specific example given, hydroxyl ions are generated at the copper electrode and cadmium ions are generated at the cadmium electrode. The hydroxyl ions so generated migrate across the porous matrix and when their concentration has reached a certain level in a region, a color change is produced. The extent of migration of the hydroxyl ions provides a time and temperature integrated record. This device operates particularly well when the electrolyte is in a frozen condition. That is, it operates when the ions generated at the metal electrolyte interface migrate through a solid state system. This provides a relaively slow moving boundary region of converted versus unconverted indicator substance, thereby providing a long term time and temperature indication. As has been previously noted, this device operates well in a frozen state. However, when this device operates wtih the electrolyte consisting solely of water and salt in a liquid state, the rate of generation of ions and the migration of the converted boundary becomes so rapid as to be of limited utility as an indicator, and further, the leading edge of the conversion area becomes less distinct. Thus, in order for this device to provide long term indication, the porous matrix must be excessively lengthy.

Figure 2:
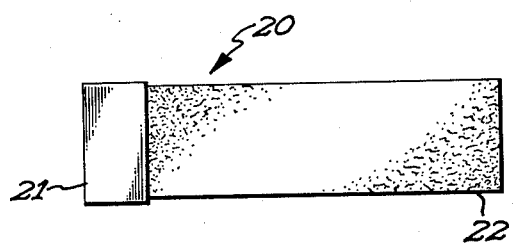
FIGURE 2 shows a schematic illustration of a device in accordance with the co-pending Renier application.

Referring now to FIGURE 2, the device shown herein operates on a related but quite dissimilar mechanism. In this device 20 generally designates the device and 21 represents a metal above hydrogen in the Electromotive Series such as magnesium. 22 designates a porous matrix substance of filter paper or the like impregnated with an electrolyte which may for example be the 5% by weight sodium chloride of the above described Tessem application. The filter paper is likewise impregnated with an indicator substance such as brilliant yellow and with a quantity of EDTA. Again as in the co-pending Tessem application the electrolyte is normally contained within a glass capsule in contact with the porous matrix. When the glass capsule is fractured, the electrolyte substance is absorbed by the porous matrix and a reaction is initiated between the metal member 21 and the electrolyte substance. This reaction proceeds in the form of the general equation given below.

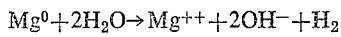

$$Mg^0 + 2H_2O \rightarrow Mg^{++} + 2OH^- + H_2$$

As can be seen, the reaction again produces metal ions and hydroxyl ions which subsequently migrate from the electrolyte-metal interface at a rate which is proportional to time and to the temperature. The indicator substance is sensitive to the presence of the hydroxyl ions generated and is converted so as to provide a moving boundary of converted versus unconverted area. As in the case of the co-pending Tessem application, this device works particularly well when the electrolyte is in the solid state and proves to be somewhat more rapid than is desirable for many systems when the electrolyte is in the liquid condition.

Figure 3:
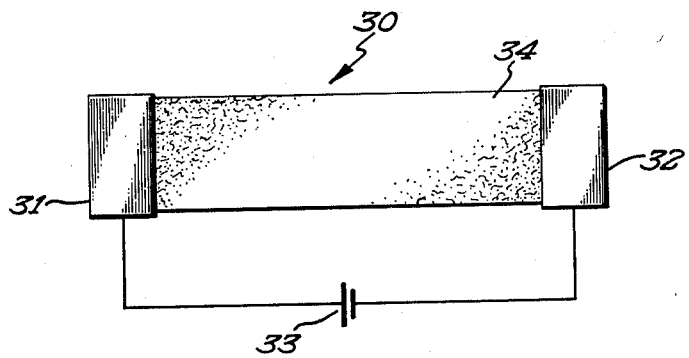
FIGURE 3 shows a schematic illustration of a device in accordance with the co-pending Morin application.

Referring to FIGURE 3, there is illustrated a device in accordance with the co-pending Morin application wherein 30 generally designates the device with 31 and 32 indicating metal members of a material such as copper. 33 represents a galvanic cell or battery which may be for example a device essentially the same as that of the Tessem application. 34 represents a porous matrix substance impregnated with a salt and water solution such as the 5% sodium chloride of the preceding two devices. In an actual device the electrolyte substance would be contained in a glass vial or the like in contact with porous member 34 until it was desired to activate the device. The device would be activated by fracturing the vial and allowing the electrolyte to impregnate the porous member 34. Upon impregnating the porous member and contacting the electrodes 31 and 32 a circuit would be completed and electrolytic action would commence. The reaction occurring at the metal electrodes 31 and 32 would be dependent upon polarity of the battery source 33, but the reaction would proceed as follows. At one electrode the electrode material would be converted from a metallic state to its respective ions and at the other electrode the water molecules would be electrolized to provide hydrogen gas and hydroxyl ions. The hydroxyl ions would then migrate along the porous matrix medium changing the pH in a region as their concentration increased and would ultimately change the color of the indicator substance so as to provide the moving boundary of converted and unconverted indicator. Again as in the previously described devices, this device operates particularly well when the electrolyte is in the frozen condition and operates considerably more rapidly when the electrolyte is in the liquid state.

I have found that all of the above devices can be operated at temperatures above 32° and be effectively tailored to fit a wide variety of indicating rates at various temperatures. This can be accomplished through variation of the electrolyte substance used in each of the above devices. It has been determined that the operation of each of the above devices has one element in common, that is, the mechanism which provides the improved time-temperature integration of the above devices is essentially the same. This mechanism is the controlling feature which makes each of these devices superior to the devices previously proposed for use in the same indicating area.

In all three of the above described devices, the rate of generation of the ions used in the indication is the critical element insofar as providing a time-temperature integration. The rate of generation of the ions is in turn dependent upon a reaction of water molecules at the metal-electrolyte interface whereby hydrogen gas is generated and hydroxyl ions are produced. In effect the ultimate controlling element in the generation of the hydroxyl ions is the availability of water molecules at this interface to bring about the reaction generating additional hydroxyl ions.

I have found that by the addition of certain organic substances to the electrolyte the rate of migration of the water molecules to the metal-electrolyte interface may be controlled for any given temperature. Further, by use of organic substances which have a high temperature coefficient of affinity for water the rate of migration of water may be markedly altered with varying temperature.

Accordingly, it is an object of the present invention to provide an electrolyte system for devices in accordance with the above identified co-pending Tessem, Renier and Morin applications which will provide time-temperature indication at temperatures above 32° F.;

More particularly, it is an object of the present invention to provide a time-temperature indicating device which may be readily varied to meet any desired rate of indication;

Other and further objects will be apparent from a study of the examples given hereinbelow.

As has been previously noted, each of the devices of the co-pending applications identified above have in common a dependency on the rate of migration of water molecules to the metal-electrolyte interface as a means of generating the ions which provide the indication. I have found that by the addition of certain viscosity increasing agents and agents which have an affinity to water that I can control the rate at which the water molecules will migrate to the metal electrolyte interface. These agents include, but are not limited to, fructose, sucrose, glycerine, and various glycols. These agents, and various related agents, provide a means of regulating the migration rate of the water molecules. The results to be achieved through use of these and related agents will best be understood from the following examples.

EXAMPLE I

In all of the examples given, the device of FIGURE 1 will be the device used to illustrate the invention. Essentially the same results are achieved in the devices as disclosed in FIGURES 2 and 3.

For the sake of simplicity of explanation, the same device has been utilized in the examples with the exception of the difference in the electrolyte used in the device. Metal members 11 and 12 of FIGURE 1 were copper and cadmium respectively. However, it should be understood that any dissimilar metals may be used. The salt substance used in the electrolyte is likewise restricted in these examples to sodium chloride, although a large variety of salts or mixtures of salts may be used in place of the sodium chloride.

Figure 4:
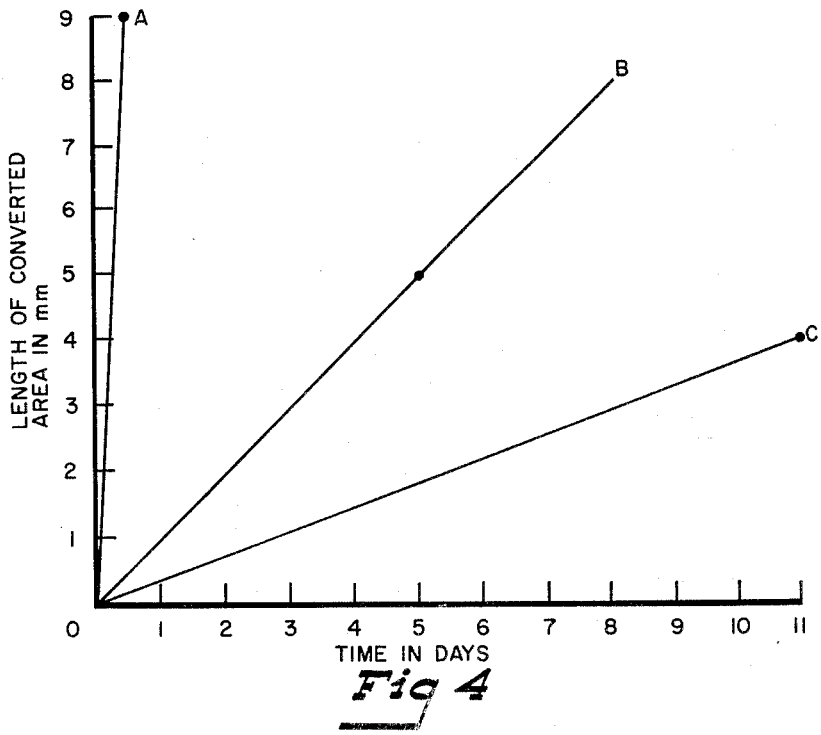
FIGURE 4 is a plot of the distance of travel of an indicating front as a function of time at 35° F. in a device in accordance with FIGURE 1 utilizing one modification of the present invention.

A device was made using copper and cadmium as the electrode members externally connected by a copper conductor as illustrated in FIGURE 1. Porous matrix member 14 was made of a strip of chromatographic paper. A solution of salt (0.1% sodium chloride by weight in water) was prepared including a quantity of brilliant yellow indicator and EDTA as described above. A quantity of this solution sufficient to moisten the paper was applied to the porous matrix. The device was then cooled rapidly to 35° F. The device was maintained at 35° F. and the movement of a boundary region of red (indicating the extent of migration of hydroxyl ion) was observed. This boundary region and the area behind it consisted of areas wherein the concentration of hydroxyl ion was sufficient to convert the brilliant yellow indicator to its red form. FIGURE 4 curve A shows the distance of movement of the boundary as a function of time. As can be seen, the movement was relatively rapid.

A second device was prepared as above except that the electrolyte consisted of one part by volume of 0.1% sodium chloride in water containing the indicator and the EDTA and to this was added one part by volume of glycerine. The movement of the boundary as a function of time at 35° F. is shown as curve B in FIGURE 4.

A third device was prepared as above except that the electrolyte in this instance contained one part by volume of 0.1% sodium chloride (with indicator and EDTA) and three parts by volume glycerine. The movement of the boundary as a function of time at 35° F. is shown as curve C of FIGURE 4. The alteration of the rate as a function of increasing concentration of glycerine is obvious. As the glycerine content of the electrolyte is increased, the rate of movement of the boundary is markedly affected. While the temperature indicated is 35° F. for the sake of ease of comparison, it should be appreciated that this same electrolyte operates similarly both at somewhat higher temperatures as well as at temperatures below the freezing point of water.

EXAMPLE II

Figure 5:
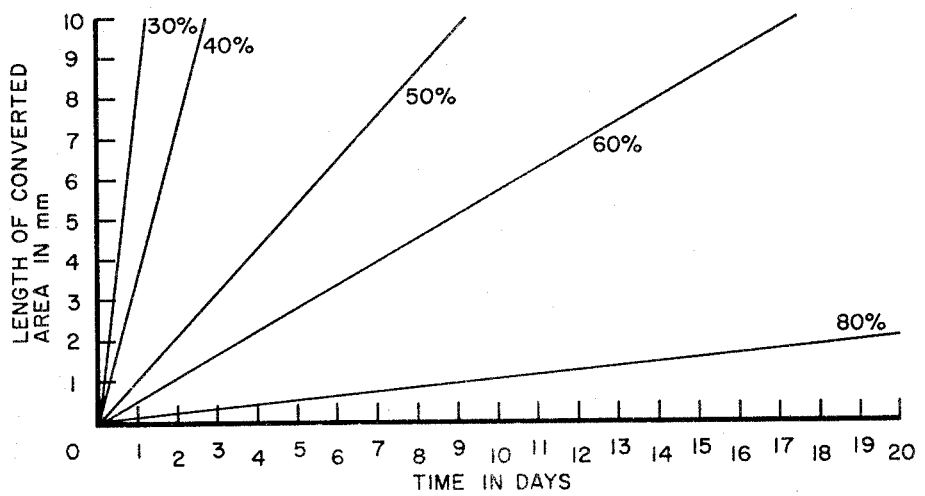
FIGURE 5 is a plot of the distance of travel of a boundary region in a device of FIGURE 1 as a function of time at 35° F. for a second modification of the present invention.

In this series of tests a quantity of 2% by weight potassium nitrate was added to a combination of water and polyethylene glycol (Dow designation E–500M). Mixtures of various percentages of the glycol as a percent of the total glycol-water combination were prepared and sufficient salt to produce a 2% by weight of the mixture potassium nitrate was added thereto. Again in this instance brilliant yellow was used as the indicator substance and a quantity of EDTA was added to the solution. The porous matrix of a device in accordance with FIGURE 1 and prepared as indicated in Example I was impregnated with this electrolyte composition wherein the quantity of glycol varied from 30% to 80% by weight. The movement of the boundary at 35° F. was measured as a function of time and is reported in FIGURE 5. As can be seen, as the percentage of the polyglycol was increased the time rate of movement of the boundary became progressively slower. Again, as in the preceding examples, the temperature conditions have been limited to 35° F. for the purpose of illustration. These glycols operate in a similar fashion over a wide range of temperatures both above and below the freezing point of water.

In Examples II and III the polyglycols referred to have the general formula:

$$HO(C_2H_4O)nC_2H_4OH$$

and are available from Dow Chemical Company of Midland, Michigan.

EXAMPLE III

A number of different polyglycols were utilized and the preparation of devices in accordance with that illustrated in FIGURE 1. In all of these examples, the salt concentration was 2% by weight potassium nitrate of a mixture of the water and glycol. The following charts illustrate the time in days necessary for the movement of the boundary over a distance of 10 millimeters. All these glycols are manufactured by Dow Chemical Company with the accompanying trade designation. Their individual viscosities at 210° F. and average molecular weights are reported in Table I. The individual figures reported in Table II indicate the time in days necessary for the boundary to move a distance of 10 millimeters.

Table I

| Poly glycols type | Viscosity at 210° F., centistokes | Average molecular weight |
|---|---|---|
| E-400 | 7.4 | 400 |
| E-500M | 16 | 550 |
| E-600 | 11.0 | 600 |
| E-1000 | 18.5 | 1,000 |
| E-4000 | 180 | 3,400 |

Table II

| Percent by weight glycol | 30% | 40% | 50% | 60% | 70% | 80% |
|---|---|---|---|---|---|---|
| E-400: | | | | | | |
| At 35° F | 1.7 | 3.8 | 11.0 | 22.5 | 57 | 90 |
| At 75° F | .7 | 1.9 | 3.8 | 7.8 | 10.5 | 15.5 |
| At 125° F | .4 | .8 | 1.6 | 4.0 | 4.8 | 8.4 |
| E-500M: | | | | | | |
| At 35° F | 1.9 | 4.0 | 13.0 | 24.5 | 31.3 | 127 |
| At 75° F | 1 | 1.7 | 3.8 | 8.7 | 14 | 20.6 |
| At 125° F | .3 | .85 | 1.7 | 4.5 | 7.8 | 7.5 |
| E-600: | | | | | | |
| At 35° F | 2.2 | 4.1 | 10.6 | 25.3 | 57.5 | 150 |
| At 75° F | 1.1 | 1.3 | 4.4 | 7.7 | 14.5 | 21 |
| At 125° F | .4 | 1.2 | 2.6 | 3.5 | 7 | 8.5 |
| E-1000: | | | | | | |
| At 35° F | 2.3 | 6.4 | 16.5 | 38.6 | 158 | 220 |
| At 75° F | 1.4 | 2.8 | 5.1 | 10.7 | 15.9 | 19.4 |
| At 125° F | .8 | 2.5 | 4.4 | 5 | 8.8 | 10 |
| E-4000: | | | | | | |
| At 35° F | 3.2 | 11.0 | 19.0 | 18.0 | 52.5 | 145 |
| At 75° F | 1.3 | 2.6 | 11.2 | 12.7 | 22.3 | 31.2 |
| At 125° F | .9 | 2.5 | 2.6 | 6.5 | 10.5 | 13.4 |

A study of the test data shown in these tables thoroughly demonstrates the effect the polyglycol has upon the operation of the device. The effect appears to be primarily one of percentage composition although it should be also noted that the viscosity of the polyglycol used apparently also exerts some effect.

As has been previously noted, other materials react in a similar manner. For example, when sucrose is added to an electrolyte substance in accordance with any of the above examples as a substitute for the polyglycol or glycerine substance, a marked decrease in the rate of the reaction of the device is seen. As can be seen from the above examples and in a similar manner in the instance of using materials such as sucrose or fructose, the beneficial effects obtained through the use of the water binding or affinity agent does not appear until the concentration reaches a level of approximately 30% by weight. At less than this concentration the effect of the additive is present, but it does not appear to be of sufficient magnitude to produce any truly useful effects. Of course, the agent used must dissolve in or be miscible with water.

While I do not wish to be bound to any particular theory of the operation, it does appear from the evidence that the water molecule cannot freely migrate to the electrode-electrolyte interface as readily as when it is entrained within a material which has water binding or water affinity characteristics. As the percentage of the agent is increased, the difficulty the water molecule has as a matter of attempting to reach the metal-electrolyte interface is increased and this effect is made more pronounced as the temperature of the system is decreased. Thus the invention has provided a means of controlling the rate of migration of the water molecule and in turn the rate of generation of the indicating ions. Also, agents which have a high temperature coefficient of water affinity will show the effect more strongly as temperature of exposure is reduced.

While all of the above discussion has been in relationship to the generation of hydroxyl ions, it should be appreciated that it is recognized that the generation of the metal ions in any of the above examples can also be used as an indicating means. That is, in the device illustrated in FIGURES 1 and 3, the metal ions generated at the electrode opposite that where the hydroxyl ion is being generated can be used as an indicating means.

Again, the rate of generation of the metal ion will be dependent upon the rate of generation of the hydroxyl ion and as has been explained this rate is dependent upon the rate of migration of the water molecule. Similarly, the metal ion generated in the device illustrated in FIGURE 2 is dependent upon the generation of the hydroxyl ion and while this metal ion can also be used as an indicating means, its generation rate will again be dependent upon the rate of migration of the water molecule to the metal-electrolyte interface.

Many substances may be utilized as the water affinity or water binding agent within the scope of the present invention. These will be readily apparent to those skilled in the art. The preceding examples are merely illustrative and are not intended to be a restriction on the scope of the present invention.

I claim:

1. In a device for indicating the extent of exposure to a temperature exceeding a certain minimum said device including a porous matrix medium impregnated with an aqueous electrolyte substance in contact with a metal member above hydrogen in the E.M.F. series near one end thereof, and wherein the indication is provided by the detection of ions migrating along said porous matrix, said ions being generated at a metal-electrolyte interface, the rate of generation of said ions being dependent on the rate of migration of the water of said electrolyte substance to said metal-electrolyte interface, the improvement which comprises including within said electrolyte substance a water miscible organic water binding substance having at least two hydroxyl groups capable of retarding the rate at which said water may diffuse to said metal-electrolyte interface.

2. In a device for indicating the extent of exposure to a temperature exceeding a certain minimum wherein a porous matrix medium is impregnated with a certain aqueous electrolyte substance and is in contact with a metal member above hydrogen in the E.M.F. series near one end thereof to form a metal-electrolyte interface, the water portion of said electrolyte substance migrating to and reacting at said interface to produce hydroxyl ions at a rate dependent upon the temperature of said device, said hydroxyl ions migrating from said metal-electrolyte interface along said porous matrix to produce a change in the acidity of said porous matrix, and an indicator substance within said electrolyte substance sensitive to said change in acidity, the improvement which comprises including within said electrolyte substance greater than about 30% by weight of a water miscible organic water binding substance having at least two hydroxyl groups capable of retarding the rate at which said water may diffuse to said metal-electrolyte interface to react to form said hydroxyl ion.

3. In a device for indicating the extent of exposure to a temperature exceeding a certain minimum said device including a porous matrix medium impregnated with an aqueous electrolyte substance in contact with a metal member above hydrogen in the E.M.F. series near one end thereof, and wherein the indication is provided by the detection of ions migrating along said porous matrix, said ions being generated at said metal-electrolyte interface, the rate of generation of said ions being dependent on the rate of migration of the water portion of said electrolyte to said metal-electrolyte interface, the improvement which comprises including within said electrolyte substance greater than about 30% by weight of glycerine.

4. In a device for indicating the extent of exposure to temperatures exceeding a certain minimum, said device including a porous matrix medium impregnated with an aqueous electrolyte substance in contact with a metal member above hydrogen in the E.M.F. series near one end thereof, and wherein the indication is provided by the detection of ions migrating along said porous matrix, said ions being generated at a metal-electrolyte interface, the rate of generation of said ions being dependent on the rate of migration of the water portion of said electrolyte to said metal-electrolyte interface, the improvement which comprises including within said electrolyte substance greater than about 30% by weight of a water miscible polyglycol.

5. A device for indicating the extent of exposure to temperatures exceeding a certain minimum comprising a porous matrix medium impregnated with an aqueous electrolyte substance containing a quantity of indicator substance, said matrix medium having in contact therewith at points remote from one another two dissimilar metal members, arranged to form a galvanic cell and being externally connected by conductive means, the water portion of said electrolyte substance migrating to and reacting at one of said metal members at a rate proportional to the temperature of said device to form hydroxyl ions, said hydroxyl ions migrating along said porous matrix medium and reacting with said indicator substance to produce a change in color thereof, said electrolyte substance being characterized in that it contains greater than 30% by weight of glycerine.

6. A device for indicating the extent of exposure to temperatures exceeding a certain minimum comprising a porous matrix medium impregnated with an aqueous electrolyte substance containing a quantity of indicator substance, said matrix medium having in contact therewith at points remote from one another two dissimilar metal members, arranged to form a galvanic cell and being externally connected by conductive means, the water portion of said electrolyte substance migrating to and reacting at one of said metal members at a rate proportional to the temperature of said device to form hydroxyl ions, said hydoxyl ions migrating along said porous matrix medium and reacting with said indicator substance to produce a change in color thereof, said electrolyte substance being characterized in that it contains greater than 30% by weight of a water miscible polyglycol.

References Cited by the Examiner

UNITED STATES PATENTS

| 3,046,786 | 7/62 | Tessem | 73—356 X |
| 3,082,624 | 3/63 | Renier | 73—356 |

OTHER REFERENCES

"Carbowax" Compounds and Polyethylene Glycols, Carbide and Chemicals Corporation, 30 East 42nd St., New York 17, New York (1964) page 3.

Physical Chemistry, by Daniels & Alberty, John Wiley & Sons, Inc. (1955), page 379.

Lange's Handbook of Chemistry, Handbook Publishers, Inc., Sandusky Ohio (1941).

ISAAC LISANN, *Primary Examiner.*